(12) United States Patent
He (10) Patent No.: US 6,545,792 B2
(45) Date of Patent: Apr. 8, 2003

(54) POLARIZATION INDEPENDENT NON-BLOCKING ALL-OPTICAL SWITCHING DEVICE

(75) Inventor: Zhan He, Bedford Hills, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/805,419

(22) Filed: Mar. 13, 2001

(65) Prior Publication Data

US 2002/0131143 A1 Sep. 19, 2002

(51) Int. Cl.[7] ............................. G02F 1/03; G02F 1/295
(52) U.S. Cl. ........................... 359/246; 359/245; 385/8
(58) Field of Search ............................. 359/245, 246, 359/279, 290, 291, 320, 324, 618; 356/347; 385/2, 3, 24, 11, 8; 349/1

(56) References Cited

U.S. PATENT DOCUMENTS

| | | | |
|---|---|---|---|
| 4,478,494 A | * 10/1984 | Soref | 359/320 |
| 4,516,837 A | 5/1985 | Soref et al. | 349/196 |
| 4,720,172 A | 1/1988 | Baker | 349/196 |
| 4,781,426 A | 11/1988 | Baker | 385/33 |
| 4,784,470 A | 11/1988 | Baker | 349/197 |
| 4,790,633 A | 12/1988 | Baker | 349/197 |
| 4,792,212 A | 12/1988 | Baker | 349/197 |
| 4,852,962 A | 8/1989 | Nicia | 385/22 |
| 4,904,052 A | 2/1990 | Rand et al. | 385/128 |
| 4,988,157 A | 1/1991 | Jackel et al. | 385/17 |
| 5,276,747 A | 1/1994 | Pan | 385/34 |
| 5,317,658 A | 5/1994 | Bergland et al. | 385/12 |
| 5,459,591 A | * 10/1995 | Faris | 359/37 |
| 5,724,165 A | 3/1998 | Wu | 359/117 |
| 5,740,288 A | * 4/1998 | Pan | 385/11 |
| 5,930,012 A | 7/1999 | Mears et al. | 359/15 |
| 6,097,859 A | 8/2000 | Solgaard et al. | 385/17 |
| 6,111,633 A | 8/2000 | Albert et al. | 349/196 |
| 6,259,831 B1 | * 7/2001 | Faris et al. | 385/8 |

* cited by examiner

Primary Examiner—Georgia Epps
Assistant Examiner—Gary O'Neill
(74) Attorney, Agent, or Firm—Gefow D. Brill, Esq.; Ralph J. Crispino (57) ABSTRACT

The present invention includes a polarization independent optical interconnect device for selectively interconnecting a plurality of optical signals between a plurality of inputs and a plurality of outputs. The present invention may provide advantages typically associated with conventional polarization based switches, including terabit per second data rates and high speed switching, to facilitate use in fiber optic networks. Moreover, the switch of this invention is polarization independent, and therefore, may route either polarized or unpolarized light. Since both the input and output light may be unpolarized, the switch of this invention may have a high light efficiency (i.e. no losses associated with an input polarizer) and minimal insertion losses as compared to typical polarization based switches.

36 Claims, 8 Drawing Sheets

(a) Non-switching state (b) Switching state

POLARIZATION INDEPENDENT NON-BLOCKING ALL-OPTICAL SWITCHING DEVICE

(1) FIELD OF THE INVENTION

The present invention relates to switching devices. This invention more specifically relates to optical switching devices for routing optical signals between multiple inputs and multiple outputs.

(2) BACKGROUND OF THE INVENTION

The use of optical fibers, particularly as a telecommunication transmission medium, has numerous advantages over existing telecommunication media (e.g. copper cable). For example, optical fibers may sustain a broader bandwidth signal and may therefore convey substantially larger quantities of information over a given period of time. Further, optical fibers emit little or no electromagnetic or radio frequency radiation and therefore have negligible environmental impact. Conversely, optical fibers are relatively insensitive to electromagnetic and radio frequency interference from the surrounding environment. As a result, optical based communication promises to play a major role in the development of national and global information infrastructure, as applications such as super-computing, telecommunications, and military $C^3I$ rely on the ability to route data at increasingly high bit rates.

To be viable, the above-mentioned applications must include some means for controllably redirecting a signal, or at least a portion thereof Many telecommunications applications require the capability to switch a signal from one wire in an input array of M wires to an output signal in one wire of an array of N output wires. Telecommunications switching, transport and routing systems make widespread use of networks called multistage interconnection networks (MIN), to accomplish this function.

In current optical network development, building intelligent optical networks is becoming highly important. In these networks, all data may be easily and quickly transported through optimized paths according to network management commands. For example if one path is impeded or otherwise not working properly, an intelligent optical network may route optical signals via another path. A critical component in these intelligent optical networks is an all-optical switching device, also referred to as an optical router. The all-optical switching/routing device cross-interconnects different input and output fiber ports together, or even different wavelength channels to redirect the data through the network system according to management commands. Optimized routing paths may be selected for the best data transporting performance according to one or more requirements.

Optical switching devices currently under development and/or in production may generally be classified into one of three types. A first is micro-electro-mechanical-system (MEMS) based micro-mirror technology (see for example U.S. Pat. No. 6,097,859, in which advanced photolithographic technology is utilized to make micro-mirrors that may be moved by the application of a voltage. Input fibers are configured such that light signals are incident on the micro-mirrors. By controlling the voltages applied to the mirrors, the incident light may be redirected into different output fibers in order to realize a crossbar connection between input and output fibers. However, since the fundamental operation of a MEMS type of switching device is based on mechanical rotation or shifting, the switching speeds tend to be limited. Current switching speeds for MEMS type devices are typically about 10 milliseconds. Further, highly accurate alignment is required such that even a minor misalignment tends to degrade switching performance. Therefore, the stability and reliability of MEMS type devices may be limited in environments where mechanical vibrations are prevalent.

A second type of optical switching device is air-bubble based optical switching (see for example U.S. Pat. No. 4,988,157). A distribution of air-bubbles may be created in light paths to realize total internal reflection and to redirect the light signals to different switching elements and finally to different output fibers, The air-bubbles may be created or eliminated by an electric voltage signal (e.g. a pulse). However, since a bubble-type switching device generally utilizes a phase change in ink materials, the switching speeds tend to be limited. Also, bubble generation and elimination generally requires a complex temperature controlling system, resulting in an expensive switching device.

A third type of all-optical switching device is a polarization-based device (see for example U.S. Pat. No. 4,516,837 to Soref et al., U.S. Pat. No. 4,852,962 to Nicia, U.S. Pat. No. 5,276,747 to Pan, and U.S. patent application Ser. No. 09/342,422 to Faris et al.,). The U.S. Patents and Patent Application cited in this paragraph are fully incorporated herein by reference. These include liquid crystal (LC) based optical switching devices. This type of all-optical switch tends to have advantages over the other two types of optical switching technologies. First, polarization based switches typically have good stability since they have no moving parts used in the switching function. Moreover, a polarization-based switch may have a high switching speed, since it depends only on the switching speed of the active materials used in the switch. For example, a switch using a nematic LC material may have a switching speed on the order of one millisecond. A switch using a ferroelectric LC material may have a switching speed on the order of one microsecond (or faster). Improvement of the switching speed in polarization based optical switches tends to be limited only by the ability to develop new active materials. One further advantage is that a polarization-based type of switching device generally has a compact profile and fabrication costs that are relatively low. This type of switch is therefore, becoming more important in optical communication research and development.

However, a generally significant disadvantage to polarization based switching devices is that they typically require incident light to be polarized. If a conventional absorptive polarizer is used either in or prior to the switch, then at least 50% of the incident light (i.e. about −3 dB) is lost. This is not acceptable for most practical applications, especially since it is common for light to be routed through numerous switching devices. Since conventional optical fibers do not preserve the polarization state of light, a polarizer is required either in or prior to each switch, resulting in rapidly accumulating losses. While some advancements have been made in polarization preserving fiber optics (see for example U.S. Pat. No. 4,904,052), these fibers generally do not preserve the polarization state with the purity required by polarization based optical switches. Further, polarization preserving optical fiber is generally significantly more expensive than conventional optical fiber. One possible solution is to utilize an optical amplifier either before or after each switching device, although this generally results in a bulkier device and also significantly increases costs.

Therefore, there exists a need for a polarization independent all-optical switching device that is also a high-speed, compact, and high-capacity device having a constant signal pathlength for all I/O permutations.

SUMMARY OF THE INVENTION

In one embodiment, the present invention is a polarization independent optical interconnect device (i.e. an optical switch) for selectively interconnecting a plurality of optical signals between a plurality of inputs and a plurality of outputs. This embodiment includes a plurality of beam splitting elements, at least two phase shifting elements disposed on at least two adjacent sides of at least one of the polarizing beam splitting elements, and a plurality of mirrors. In one variation, this embodiment may be an M×N optical interconnect device wherein one of the plurality of polarizing beam splitting elements divides unpolarized light from one of the plurality of inputs into two mutually orthogonal components, with each of the orthogonal components being routed separately through the device. Another of the plurality of polarizing beam splitting elements recombines the orthogonal components into one unpolarized beam and directs that beam to one of the plurality of outputs.

Another aspect of this invention is an optical interconnect system that includes a polarization independent optical interconnect device for selectively interconnecting a plurality of optical signals between a plurality of inputs and a plurality of outputs. The interconnect device includes at least one polarizing beam splitting element, at least two phase shifting elements superposed on at least two adjacent sides of at least one of the polarizing beam splitting elements, and a plurality of mirrors. The interconnect system of this aspect further includes a computer readable program module having a computer readable program code embodied therein for causing a computer to selectively activate and deactivate the phase shifting elements.

In yet another aspect, this invention provides a method for fabricating a polarization independent optical interconnect device. The method includes providing a plurality of polarizing beam splitting cubes and a plurality of mirrors, disposing at least two phase shifting elements on at least two adjacent sides of at least one of the plurality of polarizing beam splitting cubes, assembling the plurality of polarizing beam splitting cubes in a corner to corner arrangement with one another; and arranging the plurality of mirrors with the plurality of polarizing beam splitting cubes.

In still another aspect, this invention provides a method for selectively interconnecting a plurality of unpolarized optical signals between a plurality of inputs and a plurality of outputs. The method includes providing a polarizing beam splitting element for dividing the unpolarized electromagnetic signals into mutually orthogonal components, disposing at least one phase shifting element in the path of each of the orthogonal components, selectively actuating and deactuating at least one phase shifting element, and providing another polarizing beam splitting element for recombining the mutually orthogonal components into one unpolarized beam and directing the beam to one of the plurality of outputs.

DETAILED DESCRIPTION

Figure 3:
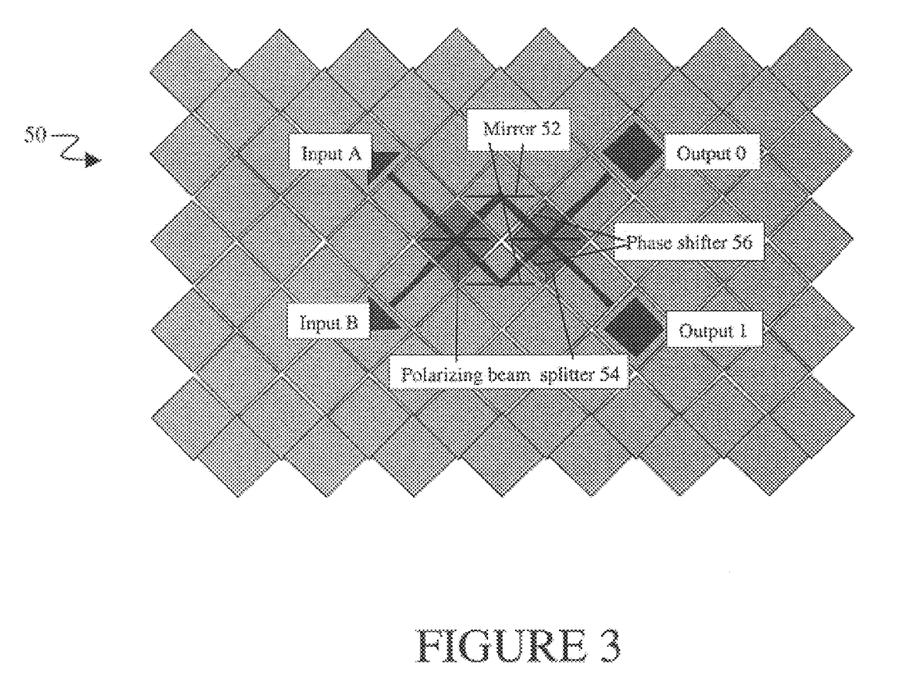
FIG. 3 illustrates the basic structure of a 2×2 embodiment of the invented optical switch.
Figure 4:
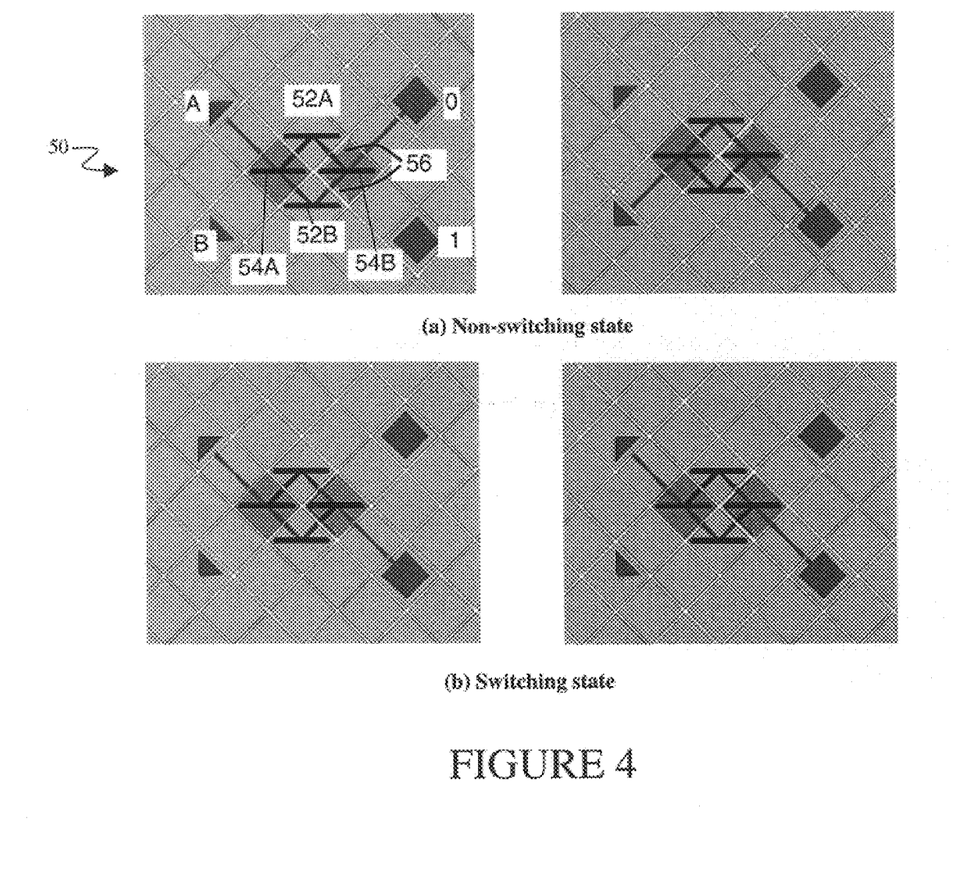
FIG. 4 illustrates the switching mechanism of the 2×2 embodiment of FIG. 3 (a) non-switching state (b) switching state.
Figure 5:
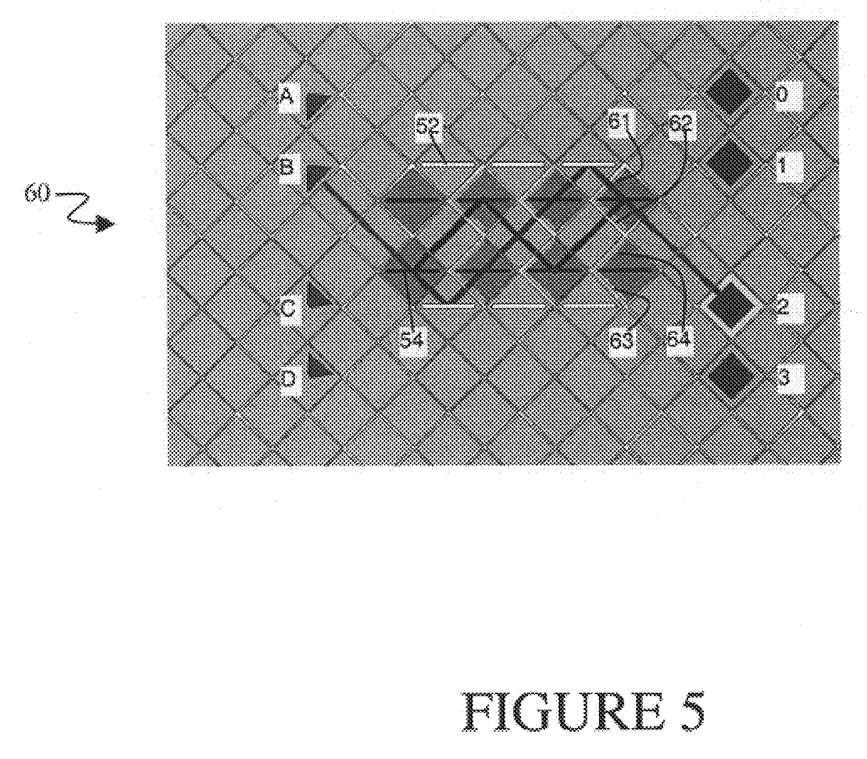
FIG. 5 illustrates the basic structure of a 4×4 embodiment of the invented optical switch.
Figure 6:
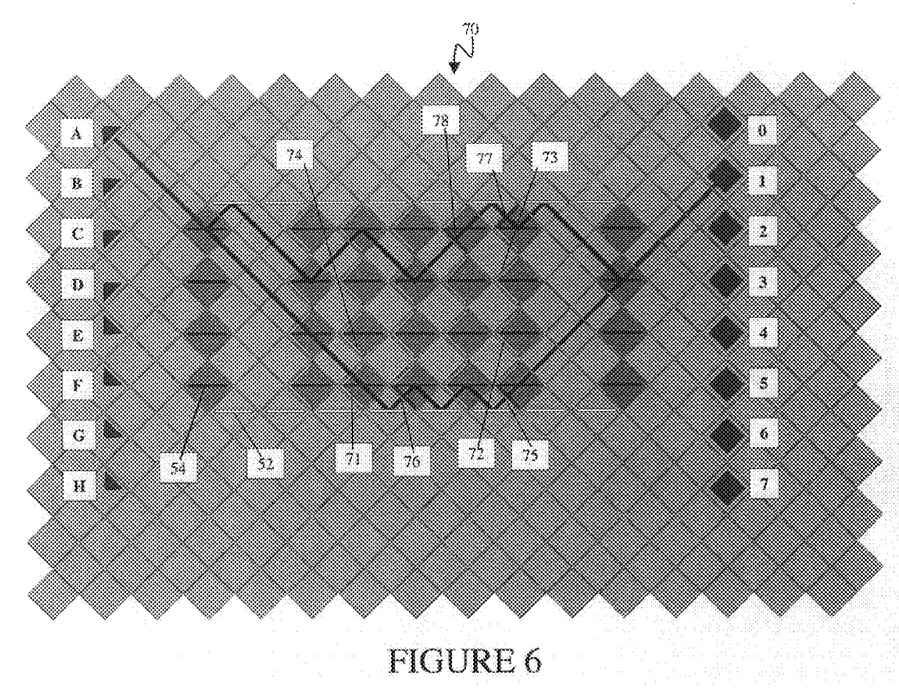
FIG. 6 illustrates the basic structure of an 8×8 embodiment of the invented optical switch.

Referring to FIGS. 3–4B, an apparatus constructed according to the principles of the present invention is shown. The present invention may be illustrated in its simplest form as a 2×2 all-optical, polarization independent switch 50. Unpolarized incident light from input fibers A, B is separated at a first element into two polarized light beams with orthogonal polarization directions. Unlike typical polarization based switches, the two beams are routed separately through different paths, preferably having equal pathlengths, in the same switching device. These beams are then combined at another element near the output fibers 0, 1. As shown, this embodiment includes a plurality of polarizing beam splitters 54, a plurality of phase shifters 56, and a plurality of mirrors 52 configured in such a manner that two discreet inputs A, B may be coupled to any combination of two discreet outputs 0, 1. These elements may further be configured for convenient scaling to switches having larger numbers of inputs and outputs (e.g. M×N). FIGS. 5 and 6 illustrate 4×4 and 8×8 switches, respectively.

The present invention may provide advantages typically associated with conventional polarization based switches, including terabit per second data rates and high speed switching, to facilitate use in fiber optic networks. Moreover, the switch of this invention is polarization independent, and therefore, may route either polarized or unpolarized light. Since both the input and output light may be unpolarized, the switch of this invention may have a high light efficiency (i.e. no losses associated with an input polarizer) and minimal insertion losses as compared to typical polarization based switches. Further, the switch of this invention, as compared to the prior art polarization independent switches, may be relatively small and compact. Further still, the switch of this invention is easily scaled such that large numbers of inputs and outputs may be interconnected (e.g. N×N or M×N). Yet further still, the switch of this invention is reconfigurable and non-blocking (i.e. the all-optical signal paths are contention-free relative to one another). The switch of this invention may also provide for bidirectional switching. The switch of this invention may further be easily fabricated and therefore may provide for a relatively low cost optical interconnect. Yet further still, this invention, unlike conventional MEMS technology, is relatively robust and insensitive to environmental disturbances. The present invention is also advantageous in that the plurality of all-optical signal paths have substantially the same pathlength, which provides for constant latency and attenuation and unskewed data output.

Where used in this disclosure, the term "optical" shall refer to a device or pathway through a device adapted to channel electromagnetic energy. Similarly, the term "all-optical" shall refer to a device or network of devices adapted to transmit or channel electromagnetic energy therethrough without converting the energy into other types of signals, such as electrical or electronic signals. The terms "electromagnetic energy", "electromagnetic radiation", and "electromagnetic signal" shall refer to electromagnetic waves within the electromagnetic spectrum ranging from gamma rays to radio waves and including visible light. The term "transparent" shall be defined as being capable of permitting an optical signal to flow therethrough without substantially altering the polarization state or intensity thereof. Further, throughout this disclosure, orthogonal polarization states, whether they are s or p or left-hand circularly polarized (LH) or right-hand circularly polarized (RH) light are referred to simply as orthogonal polarization states P1 and P2. Additionally, as used herein, the term "computer" or "computer subsystem" shall refer to any computer, computer workstation, dedicated processor, microprocessor or dedicated micro-controller.

Referring now to FIGS. 1–7, the prior art and the apparatus and method of the present invention are more thoroughly described. Recently several methods have been disclosed for achieving a polarization based optical switching device that is independent of the incident polarization state. Mears, et al., in U.S. Pat. No. 5,930,012, disclose a liquid crystal spatial light modulator for generating pre-designed polarization holograms to realize polarization independent switching. However, the loss in the Mears et al., device tends to be high owing to low diffraction grating efficiency. Albert et al., in U.S. Pat. No. 6,111,633, disclose a device in which a critical incident angle is chosen to realize total reflection for both P1 and P2 polarized light at the surface between the glass and a liquid crystal layer in a particular switching state. However, since there are critical index of refraction requirements on prism materials and liquid crystal materials, the materials that may be used in constructing this type of device tend to be limited. Further, when the Albert et al., switching element is used to scale up to a large 1×N or M×N switching device, the losses in different channels may not be equal to one another, which may cause application difficulties and system complications. The Mears et al., and Albert et al., U.S. Patents cited in this paragraph are fully incorporated herein by reference.

Baker et al., in U.S. Pat. Nos. 4,720,172, 4,781,426, 4,784,470, 4,790,633, and 4,792,212, disclose a device wherein unpolarized light is separated into two orthogonal polarized light beams by a passive LC layer. The Baker et al., U.S. Patents are fully incorporated herein by reference. These two beams then pass through an active LC layer and are then combined together at another passive LC layer close to the output fibers.

However, in scaling Baker's 2×2 switching element to an N×N switching device, the signal beam is separated and re-combined at each element, which tends to result in high insertion losses.

Figure 1:
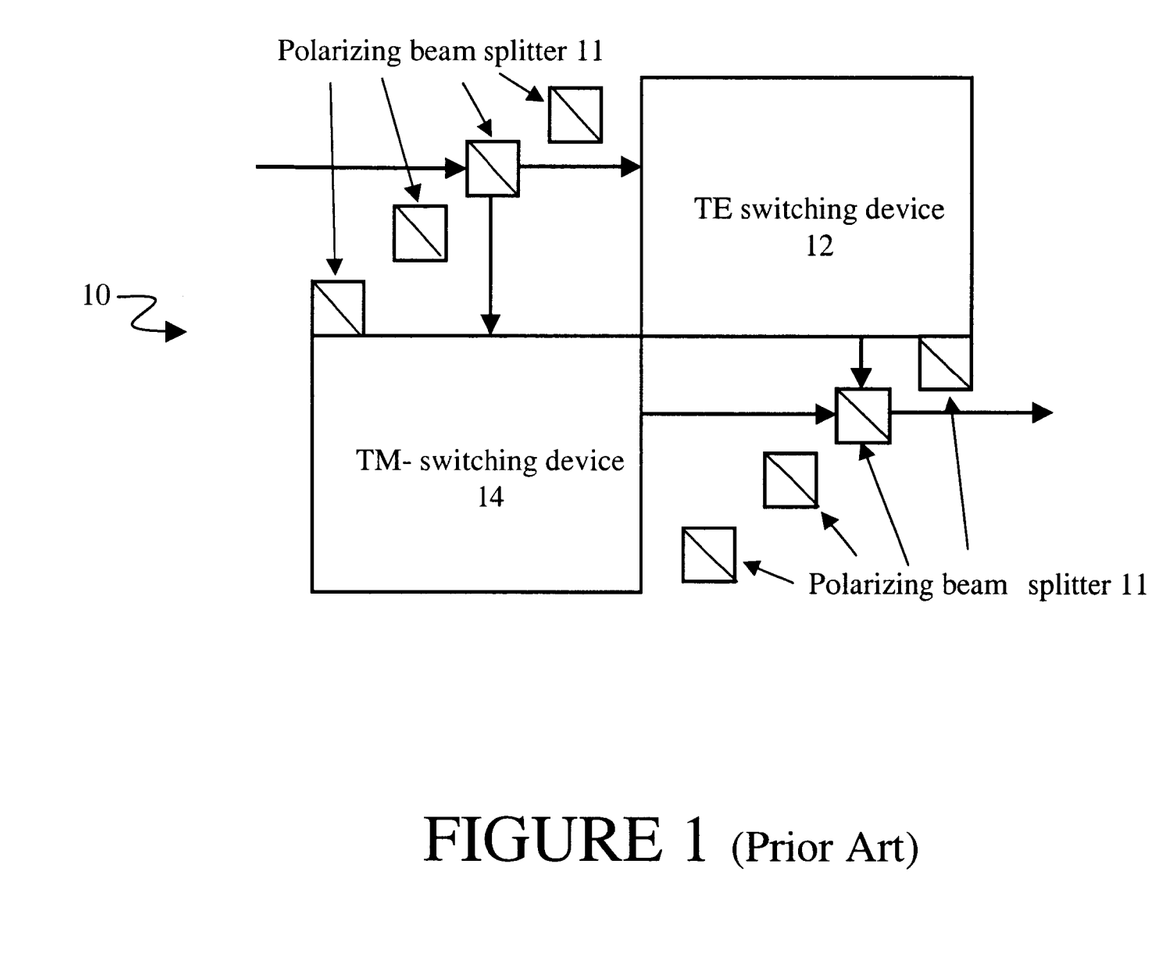
FIG. 1 illustrates the basic structure of a polarization independent optical switch of the prior art.

Bergland et al., in U.S. Pat. No. 5,317,658, disclose an apparatus that includes a polarizing beam splitter 11 (FIG. 1) used to separate unpolarized light into two orthogonally polarized beams. The Bergland et al., U.S. Patent is fully incorporated herein by reference. Each of the beams is guided into a mutually distinct switching device (12 and 14, respectively) that functions for that particular polarization state. After the individual beams are routed, they are recombined via a second polarizing beam splitter to the output port of choice. FIG. 1 illustrates a 4×4 embodiment of the Bergland et al., device. As shown, two switches are necessary (one for each polarization state of light), which tends to result in a large and costly device, especially as it scaled to large numbers of inputs and outputs (e.g. N×N).

Figure 2:
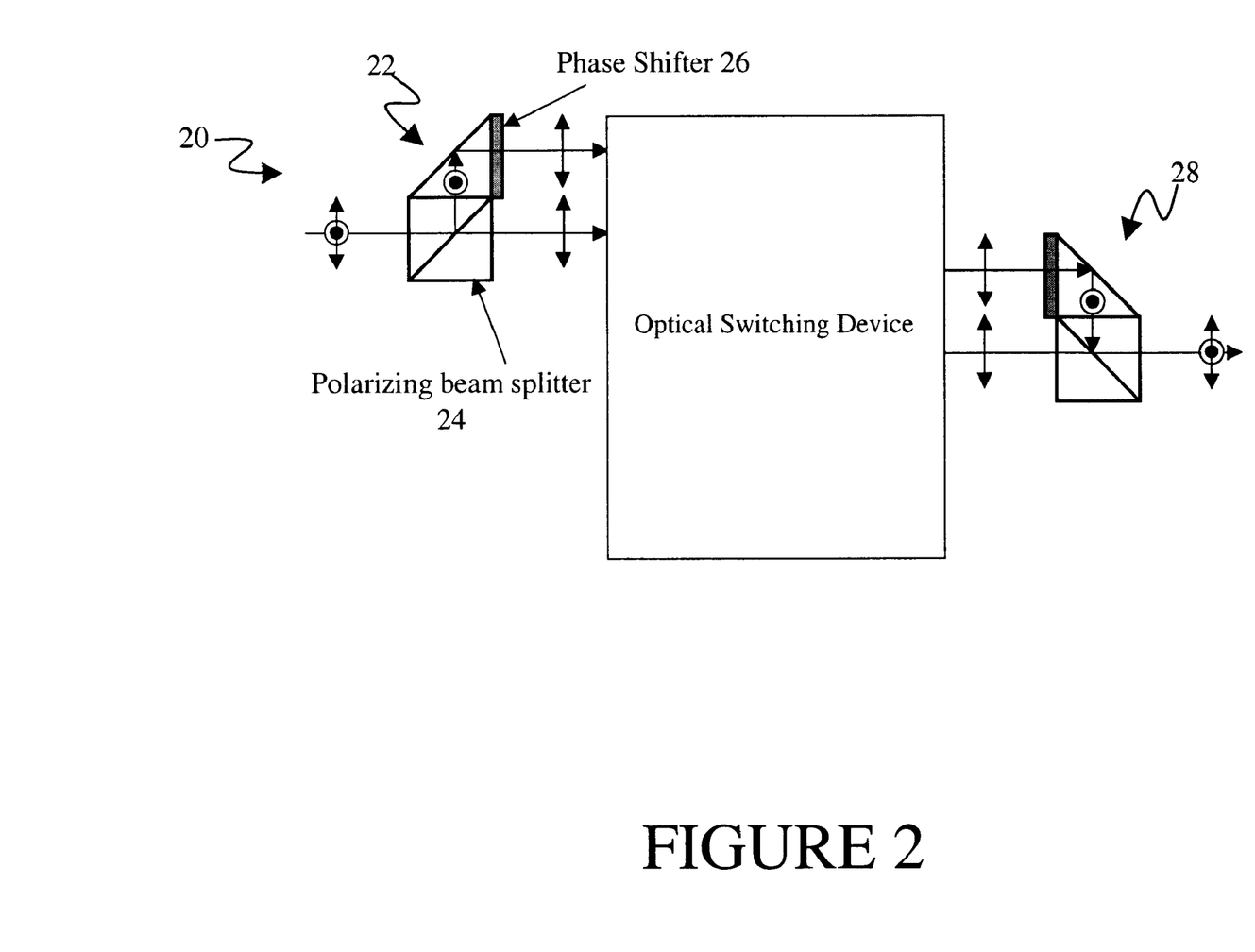
FIG. 2 illustrates the basic structure of a polarization independent optical switch of the prior art that uses a polarization converter and a polarization combiner.

Wu in U.S. Pat. No. 5,724,165 discloses an apparatus in which a polarization converter is inserted immediately downstream of the input fiber and a polarizing combiner is inserted immediately upstream of the output fiber. The Wu U.S. Patent is fully incorporated herein by reference. The basic structure of this device is illustrated in FIG. 2. A polarization converter 22 generates two parallel light beams with virtually identical polarization by using a polarizing beam separator 24 and a phase shifter 26. The two beams are then routed simultaneously through the switching devices. At the output ports, a polarization combiner 28 is used to merge the two beams together into one beam that is coupled into an optical fiber. This device, however, is relatively large since it must switch the two beams in parallel.

As stated hereinabove, the switch of this invention includes a plurality of polarizing beam splitters 54, a plurality of mirrors 52 and a plurality of phase shifters 56. Referring now to FIG. 3, a 2×2 polarization independent switch 50 is shown to include two of each of the above elements. A typical polarizing beam splitter divides incident light (typically unpolarized) into two orthogonal polarized components (e.g. into vertical (s) and horizontal (p) polarization states). Examples of commercially available polarizing beam splitters include those manufactured by Melles Griot, 16542 Millikan Avenue, Irvine, Calif. or CVI Technical Optics, Ltd., Second Avenue, Onchan, Isle of Man IM3 4PA, England. Polarizing beam splitter 54 may be of any type and configuration, although a polarizing beam splitting cube (as shown) is preferred. Further, polarizing beam splitter 54 may utilize any type of polarizer element. For example polarizing beam splitter 54 may include a conventional MacNiell-type polarizing reflector, a cholesteric liquid crystal layer, or an inorganic reflecting polarizer. These devices operate in a known manner to selectively reflect light having one polarization state (e.g. P1) and transmit light having the orthogonal polarization state (P2).

Phase shifter 56 may be constructed of any type of electrically controllable birefringent material generally in the form of a half-wave retarder. Phase shifter 56 may also be a liquid crystal cell, for example having a 90° twisted (or a 270° super-twisted) nematic liquid crystal, homogeneously aligned nematic liquid crystal or ferroelectric liquid crystal. For example, when no electric field is applied to either of the above devices a beam having a polarization P1 incident on phase retarder 56 is converted to a beam having a polarization P2 as it passes therethrough. When a predetermined electric potential is applied to the phase shifter 56 a beam having a polarization P1 (or P2) maintains its state of polarization as it passes therethrough. Conversely, a phase shifter 56 may be used that changes incident light from P1 to P2 (or P2 to P1) upon the application of an applied voltage and allows a polarized light to pass through unaffected when no field is applied. Hereinbelow, phase shifter 56 is referred to as active or activated when it is configured to change the polarization state of incident light from P1 to P2 (or from P2 to P1). Otherwise it is referred to as inactive or deactivated.

Referring now to FIG. 4, the operation of switching device 50 is as follows. Switch 50 is configured to receive incident unpolarized light from optical fibers at inputs A and B. It is important to note that light incident from an optical fiber is generally unpolarized since optical fibers do not preserve the polarization state of light. Unpolarized light incident at input port A is divided into P1 and P2 components by beam splitter 54A. One component (P1 for example) is reflected towards the top mirror 52A, while the other (P2) is transmitted towards the bottom mirror 52B. In the non-switching state, phase shifters 56 are inactive and both beams pass therethrough unaffected. Light reflected from mirror 52A is reflected again at polarizing beam splitter 54B while light reflected from mirror 52B is transmitted through the polarizing element in polarizing beam splitter 54B. The two beams (P1 and P2) are, therefore, recombined at polarizing beam splitter 54B and directed towards output port 0. In the switching state, the phase shifters are activated such that the beam with a polarization state of P1 is converted to a polarization state P2 and the beam with a polarization state of P2 is converted to a polarization state of P1. Light reflected from mirror 52A is now transmitted through polarizing beam splitter 54B, while light reflected from mirror 52B is reflected again at polarizing beam splitter 54B. The two beams (P2 and P1) are recombined at polarizing beam splitter 54B and directed towards output port 1. The artisan of ordinary skill will readily recognize that a similar discussion may be applied to light incident at input port B. In the non-switching state light is directed towards output port 1, while in the switching state light is directed towards output port 0.

Referring now to FIG. 5, a 4×4 switch 60 is shown. In this configuration, four inputs A, B, C, and D may be routed to any one of four outputs 0, 1, 2, and 3. Switch 60 functions in a manner similar to that of switch 50 in that unpolarized light is divided into orthogonal components (P1 and P2), which are routed separately through the device, with phase shifters 56 being utilized to change the routing paths. When phase shifters 56 are all inactive in switch 60, input A is routed to output 0, input B to output 2, input C to output 1, and input D to output 3. In order to achieve other routing configurations, one or more of phase shifters 56 are activated. For example, input B may be routed to output 0 by activating phase shifters 61 and 62 on the upper and rightmost beam splitter. Likewise input D may be routed to output 1 by activating phase shifters 63 and 64 on the lower and rightmost beam splitter. In a similar manner any one of inputs A, B, C, D may be routed to anyone of outputs 0, 1, 2, 3 by activating or deactivating the appropriate phase shifters 56.

Referring now to FIG. 6, an 8×8 switch 70 is shown. In this configuration, eight inputs A, B, C, D, E, F, G, and H may be routed to any one of eight outputs 0, 1, 2, 3, 4, 5, 6, and 7. Switch 70 functions similarly to switches 50, 60 in that unpolarized light is divided into orthogonal components (P1 and P2), which are routed separately through the device, with phase shifters 56 being utilized to change the routing paths. Switch 70 generally requires one or more phase shifters 56 to be activated for each switching configuration. For example, input A may be routed to output 0 by activating phase shifters 71 and 72. Input A may be rerouted to output 7 by deactivating phase shifter 72 and activating phase shifter 73. Likewise input F may be routed to output 6 by activating phase shifters 74 and 75. In a similar manner any one of inputs A, B, C, D, E, F, G, H may be routed to any one of outputs 0, 1, 2, 3, 4, 5, 6, 7 by activating or deactivating the appropriate phase shifters 56. The artisan of ordinary skill will recognize that the switches of this invention, including switches 60 and 70, may enable an optical signal to be routed via more than one signal path between any one input and output. For example input A in switch 70 may also be routed to output 1 by activating phase shifters 73, 76, 77 and 78. The switch of this invention is therefore reconfigurable.

As mentioned above, the switch of the present invention may be scaled to accommodate a higher number of input and output channels. For example 16×16, 24×24, 32×32, 48×48, 64'64, and etc., polarization independent all-optical interconnects may readily be constructed by combining a plurality of polarizing beam splitters 54, phase shifters 56 and mirrors 52. Further, the switch of this invention may utilize various switching architectures, such as those disclosed by Faris et al., in U.S. patent application Ser. No. 09/342,422. Further still, asymmetric interconnects having an M×N architecture, such as 4×8, 24×64, 1×16, 16×12, and etc., may readily be fabricated by combining a plurality of the above-mentioned elements. The artisan of ordinary skill will readily recognize that the switches of the present invention (e.g. an 8×8 switch) may be assembled in any one of numerous configurations. The ordinarily skilled artisan will also recognize that the switches of this invention may be configured to be bidirectional (i.e. inputs A, B, C, D, . . . M may be used as outputs, while outputs 0, 1, 2, 3, . . . N may be used as inputs).

The switches of the present invention may be manufactured in any suitable manner. In one configuration, designed for ease of manufacturing, the switches disclosed herein may be thought of as including a plurality of each of three principle elements: (i) polarizing beam splitting cubes, (ii) mirrors, and (iii) polarizing beam splitting cubes including phase shifting elements disposed on each of two adjacent sides. These three components may be fabricating separately and then assembled together in a checkerboard like pattern to achieve the appropriate optical interconnect design configuration (for example the 2×2, 4×4 and 8×8 configurations shown in FIGS. 3–6).

Figure 7:
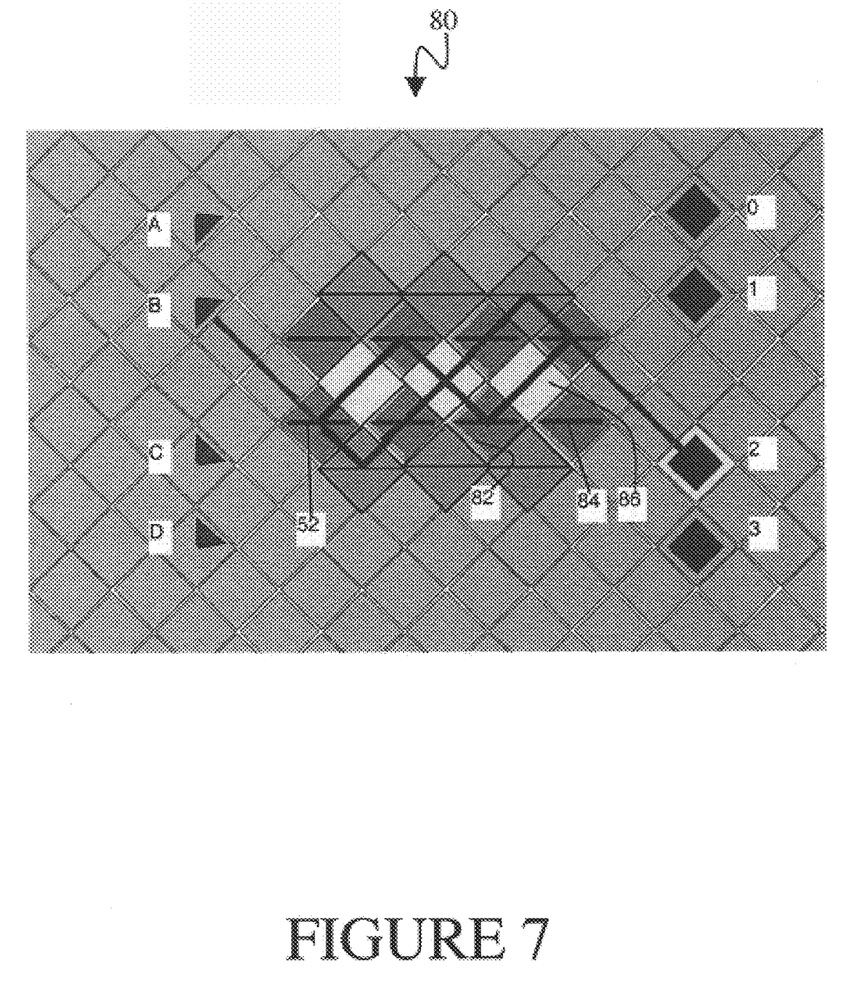
FIG. 7 illustrates the basic structure of a 4×4 solid state optical switch.

In another configuration, which is also designed for ease of manufacturing, the optical switch of this invention may be a solid state interconnect device 80, in that it includes a plurality of substantially all-solid electromagnetic signal paths. A 4×4 configuration of switch 80 is shown in FIG. 7. Switch 80 includes a plurality of each of four principle elements; (i) polarizing beam splitter cubes 52, (ii) polarizing beam splitting cubes including phase shifting elements disposed on each of two adjacent sides 82, (iii) a mirror that includes a transparent cube with a reflective film disposed therein 84, and (iv) transparent cubes (e.g. glass) 86. These components may be fabricated separately and then assembled together in a checkerboard like pattern to achieve any desired optical design configuration (e.g. M×N). In general polarizing beam splitting cubes 52 are assembled in a corner to corner arrangement with one another, while transparent cubes 86 and polarizing beam splitting cubes 52 are assembled in surface to surface arrangement to one another. One potential advantage of a switch comprising substantially all-solid signal paths (e.g. switch 80) is that it may substantially reduce Fresnel losses that result from reflections at interfaces where there is a change in index of refraction (e.g. glass/air interfaces). Index matching couplant may be used to further reduce Fresnel losses. A further advantage of switch 80 is that it may significantly reduce insertion losses. Switch 80 may be further advantageous in that it is resistant to mechanical vibration.

Figure 8:
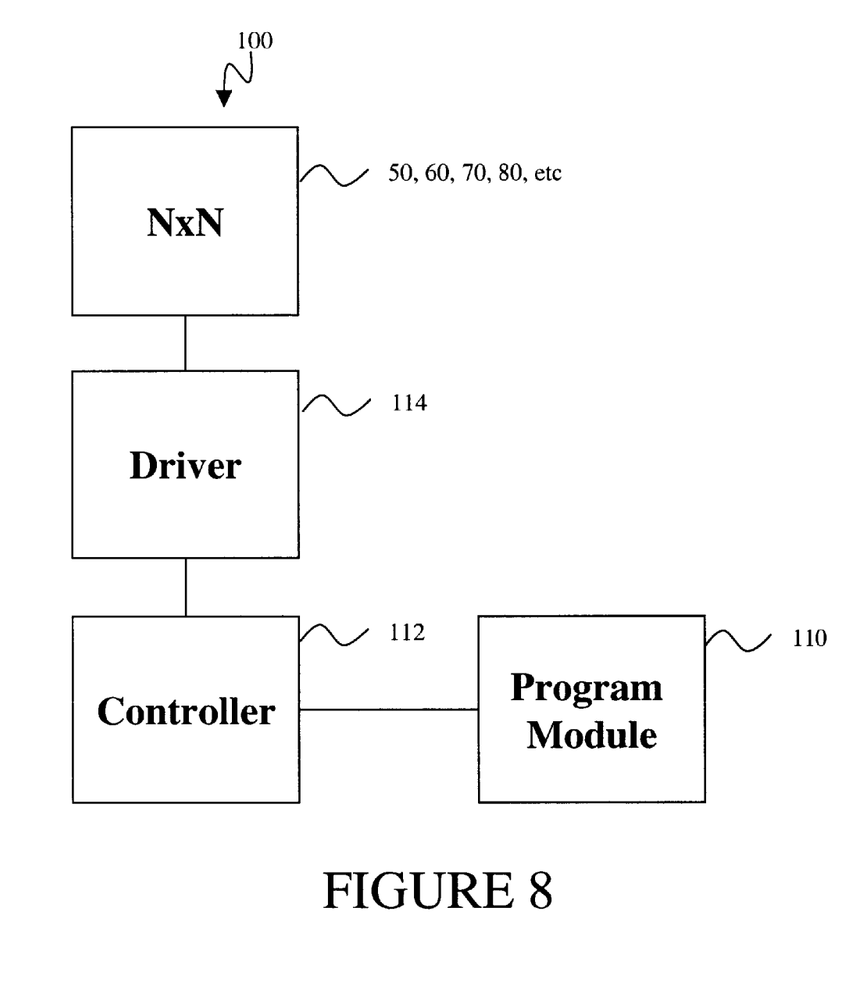
FIG. 8 is a block diagram of an interconnect system including and N×N switch of the present invention.

Turning now to FIG. 8, any of the aforementioned switches 50, 60, 70, 80, and etc., may be incorporated into an interconnect system 100. As shown, interconnect system 100 is preferably a computer implemented device including a program module 110 which includes a computer usable medium having computer readable program code or instructions embodied thereon. The program code includes any of various routing algorithms as discussed hereinabove. The program module is disposed in communication with a controller 112 adapted to operate in a conventional manner to control access to the program module 110 by a computer subsystem (not shown). Controller 112 is disposed in communication with a driver 114, which operates in a conventional manner to interface with the switch. Driver 114 may comprise a hardware device or, preferably, may be implemented in software as a software module. Program module 110, controller 112, and driver 114 thus comprise control means adapted to operate the N×N switches for routing signals between each input and output port as shown an described hereinabove.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A polarization independent optical interconnect device for selectively interconnecting a plurality electromagnetic signals between a plurality of inputs and a plurality of outputs, said interconnect device comprising:
   a plurality of polarizing beam splitting elements;
   at least two selectively actuatable phase shifting elements being disposed on at least two adjacent sides of at least one of said polarizing beam splitting elements; and
   a plurality of mirrors operatively engaged with said plurality of polarizing beam splitter elements.

2. The optical interconnect device of claim 1 further comprising a plurality of all-optical signal paths extending between said plurality of inputs and said plurality of outputs.

3. The optical interconnect device of claim 2 wherein each of said plurality of all-optical signal paths has substantially the same pathlength.

4. The optical interconnect device of claim 2 wherein each of said plurality of all-optical signal paths has substantially the same latency.

5. The optical interconnect device of claim 2 wherein each of said plurality of all-optical signal paths provides substantially the same signal attenuation relative to one another.

6. The optical interconnect device of claim 2 wherein each of said plurality of all-optical signal paths are substantially contention-free relative to one another.

7. The optical interconnect device of claim 1 wherein one of said plurality of polarizing beam splitting elements divides unpolarized light from one of said plurality of inputs into two mutually orthogonal components, each of the orthogonal components being routed separately through said device, and another of plurality of said polarizing beam splitting elements recombines the orthogonal components into one unpolarized beam and directs the beam to one of said plurality of outputs.

8. The optical interconnect device of claim 7 configured to form a M×N switching device, where M is the number of said plurality of inputs and N is the number of said plurality outputs.

9. The optical interconnect device of claim 8 wherein M and N are even numbers in the range from 2 to 256.

10. The optical interconnect device of claim 9 wherein M and N are members of the group consisting of 2, 4, 8, 12, 16, 24, 32, 48, 64, 96 and 128.

11. The optical interconnect device of claim 8 wherein M is 1.

12. The optical interconnect device of claim 8 wherein M equals N.

13. The optical interconnect device of claim 8 being a bidirectional device.

14. The optical interconnect device of claim 1 wherein said plurality of polarizing beam splitting elements is a plurality of polarizing beam splitting cubes.

15. The optical interconnect device of claim 14 wherein said plurality of polarizing beam splitting cubes are arranged in a corner to corner arrangement with one another.

16. The optical interconnect device of claim 15 wherein said plurality of mirrors each include a transparent cube and a reflective layer disposed therein.

17. The optical interconnect device of claim 16 further comprising a plurality of transparent cubes.

18. The optical interconnect device of claim 17 wherein said transparent cubes are disposed in a surface to surface alignment with said plurality of beam splitting cubes.

19. The optical interconnect device of claim 17 further comprising a plurality of substantially all-solid signal paths.

20. The optical interconnect device of claim 1 wherein said plurality of polarizing beam splitting elements each include a reflective polarizer.

21. The optical interconnect device of claim 20 wherein said reflective polarizer is a cholesteric liquid crystal polarizing layer.

22. The optical interconnect device of claim 20 wherein said reflective polarizer is MacNeill-type reflective polarizer.

23. The optical interconnect device of claim 20 wherein said reflective polarizer is an inorganic reflective polarizer.

24. The optical interconnect device of claim 1 wherein said plurality of phase shifting elements each include a liquid crystal material.

25. The optical interconnect device of claim 24 where said liquid crystal material is a twisted nematic liquid crystal.

26. The optical interconnect device of claim 25 where said liquid crystal material is a 90° twisted nematic liquid crystal.

27. The optical interconnect device of claim 24 wherein said liquid crystal material is a ferroelectric liquid crystal.

28. The optical interconnect device of claim 1 wherein said plurality of phase shifting elements each include a birefringent material.

29. The optical interconnect device of claim 1 wherein said plurality of phase shifting elements have a phase shifting time of less than 0.001 second.

30. The device of claim 1 wherein said plurality of mirrors include a highly reflective silver coating.

31. An optical interconnect system comprising:
   a polarization independent optical interconnect device for selectively interconnecting a plurality of electromagnetic signals between a plurality of inputs and a plurality of outputs, said interconnect device comprising: (i) at least one polarizing beam splitting element, (ii) at least one polarizing beam splitting element including selectively actuatable phase shifting elements superposed on at least two adjacent sides thereof; and (iii) a plurality of mirrors;
   a computer readable program module having a computer readable program code embodied therein for causing the computer to selectively actuate and deactuate said phase shifting elements.

32. The interconnect system of claim 31 further comprising disposed in operative engagement with said program module and with said optical interconnect device for said selective actuation and deactuation.

33. The interconnect system of claim 32 further comprising a controller operatively engaged with said program module and said driver for controlling said operative engagement of said program module with said driver.

34. A method for fabricating a polarization independent optical interconnect device, said method comprising:
   providing a plurality of polarizing beam splitting cubes and a plurality of mirrors;
   disposing at least two selectively actuatable phase shifting elements on at least two adjacent sides of at least one of said plurality of said polarizing beam splitting cubes;

assembling said plurality of polarizing beam splitting cubes in a corner to corner arrangement with one another; and arranging said plurality of mirrors in operative engagement with said plurality of polarizing beam splitting cubes.

35. The method of claim 34 wherein said method further includes arranging a plurality of transparent cubes in a surface to surface arrangement with said plurality of polarizing beam splitting cubes.

36. A method for selectively interconnecting a plurality of unpolarized electromagnetic signals between a plurality of inputs and a plurality of outputs, said method comprising:

providing a polarizing beam splitting element for dividing said unpolarized electromagnetic signals into mutually orthogonal components;

disposing at least one selectively actuatable phase shifting element within the path of each of said orthogonal components;

selectively actuating and deactuating said at least one phase shifting element; and providing another polarizing beam splitting element for recombining the mutually orthogonal components into one unpolarized beam and directing said beam to one of said plurality of outputs.

* * * * *